(12) United States Patent
Torras-Pique et al.

(10) Patent No.: US 9,970,188 B2
(45) Date of Patent: May 15, 2018

(54) DRAINAGE DEVICE

(71) Applicants: 3P Technik Filtersysteme GmbH, Donzdorf (DE); H2O Research GmbH, Muenster (DE)

(72) Inventors: Jorge Torras-Pique, Bad Ueberkingen (DE); Carsten Dierkes, Muenster (DE)

(73) Assignees: H₂O Research GmbH, Münster (DE); 3P Technik Filtersysteme GmbH, Donzdorf (DE)

(*) Notice: Subject to any disclaimer, the term of this patent is extended or adjusted under 35 U.S.C. 154(b) by 862 days.

(21) Appl. No.: 14/341,553

(22) Filed: Jul. 25, 2014

(65) Prior Publication Data
US 2014/0332453 A1 Nov. 13, 2014

Related U.S. Application Data

(63) Continuation of application No. PCT/EP2012/004945, filed on Nov. 30, 2012.

(30) Foreign Application Priority Data

Jan. 27, 2012 (DE) .................. 10 2012 001 574

(51) Int. Cl.
*E03F 5/04* (2006.01)
*C02F 1/42* (2006.01)
(Continued)

(52) U.S. Cl.
CPC .............. *E03F 5/0404* (2013.01); *C02F 1/42* (2013.01); *E01C 11/227* (2013.01); *E03F 3/046* (2013.01);
(Continued)

(58) Field of Classification Search
None
See application file for complete search history.

(56) References Cited

U.S. PATENT DOCUMENTS 5,788,849 A 8/1998 Hutter, Jr. et al.
6,192,915 B1 2/2001 Valperz et al.
(Continued)

FOREIGN PATENT DOCUMENTS

DE 202008000787 5/2008
DE 202008004861 9/2009
(Continued)

OTHER PUBLICATIONS

International Search Report in counterpart International Application No. PCT/EP2012/004945, dated Oct. 14, 2013.

*Primary Examiner* — Robert James Popovics
(74) *Attorney, Agent, or Firm* — Edell, Shapiro & Finnan LLC

(57) ABSTRACT

In a drainage device for draining road surfaces, parking areas, roof surfaces or the like, comprising a trough body and filter material which is situated in the trough body and is intended for cleaning water loaded with solid particles and/or dissolved pollutants, the filter material is a constituent part of a filter device which has a plurality of filter elements which can be handled individually and, if required, can be removed from the trough body, which filter elements each have a water-permeable enveloping wall with the filter material situated within the enveloping wall.

1 Claim, 10 Drawing Sheets

(51) Int. Cl.
  *E01C 11/22* (2006.01)
  *C02F 103/00* (2006.01)
  *E03F 3/04* (2006.01)

(52) U.S. Cl.
  CPC ............ *E03F 5/041* (2013.01); *E03F 5/0403* (2013.01); *C02F 2103/001* (2013.01); *C02F 2201/002* (2013.01); *C02F 2307/00* (2013.01)

(56) References Cited

U.S. PATENT DOCUMENTS

| | | | |
|---|---|---|---|
| 6,368,499 B1 | 4/2002 | Sharpless | |
| 6,869,525 B1 | 3/2005 | Happel | |
| 7,381,333 B1 | 6/2008 | Rainer | |
| 2014/0332453 A1* | 11/2014 | Torras-Pique | ........ E01C 11/227 210/163 |

FOREIGN PATENT DOCUMENTS

| | | |
|---|---|---|
| WO | 2008073818 | 6/2008 |
| WO | 2009028893 | 3/2009 |

* cited by examiner

DRAINAGE DEVICE

CROSS REFERENCE TO RELATED APPLICATIONS

This application is a continuation of International Application No. PCT/EP2012/004945, filed on Nov. 30, 2012, entitled "Drainage Device," which claims priority under 35 U.S.C. § 119 to Application No. DE 10 2012 001 574.7 filed on Jan. 27, 2012, entitled "Drainage Device," the entire contents of which are hereby incorporated by reference.

FIELD OF THE INVENTION

The invention relates to a drainage device for draining road surfaces, parking areas, roof surfaces or the like, comprising a trough body and filter material which is situated in the trough body for purifying water loaded with solid particles and/or dissolved pollutants.

BACKGROUND

A drainage device of this type is, for example, known from DE 20 2008 004 861 U1. The device disclosed in this publication, which is designed for discharging filtered rain water, comprises a trough body filled with filter granulate. A half-drainage pipe through which the filtered water is drained is embedded in the filter granulate. As time passes, filtration residues accumulate in the filter granulate, necessitating the replacement of the filter granulate. For this purpose, the filter granulate has to be removed from the trough body, which is accomplished by extraction as a rule. The filter granulate also has to be removed for the maintenance of the half-drainage pipe.

SUMMARY

The invention is based on the problem of creating a drainage device of the type referred to above, which can be handled simply and cost-effectively, in particular in terms of maintenance and the replacement of filter material, and with which contaminated water can be filtered more effectively.

This problem is solved by a drainage device with the features of the independent claim 1 and the features of the independent claim 9. Further developments of the invention are specified in the dependent claims.

The drainage device according to the invention is characterised in that the filter material is a constituent part of a filter apparatus which comprises a plurality of filter elements which can be handled individually and, if required, can be removed from the trough body, each of the filter elements having a water-permeable enveloping wall with the filter material placed within the enveloping wall.

This makes it possible to remove the filter elements from the trough body in a simple way. There is no longer any need to extract filter granulate as, for example, in the case of the prior art mentioned above. Furthermore, specific individual filter elements can be replaced while other filter elements can remain in the trough body. This is, for example, useful if maintenance or repair work has to be performed at a specific point along the trough body. As a whole, the drainage device according to the invention offers a considerable time advantage when replacing filter material or performing maintenance, inspection or repair operations, resulting in not inconsiderable cost advantages.

In a further development of the invention, the water-permeable enveloping wall is flexible. In a particularly preferred embodiment, the water-permeable enveloping wall is represented by a bag envelope which is in particular made of a woven fabric. In this case, the filter elements can be referred to as filter bags filled with filter material. Alternatively, the enveloping wall could conceivably be rigid, so that the filter elements can be designed as containers filled with filter material.

In a further development of the invention, the filter apparatus comprises at least one water-permeable filter element support for the filter elements, which is in particular releasably secured in the trough body. In this case, it is possible for the filter element support to remain in the trough body, while only individual filter elements are removed. Alternatively, it is, however, also possible for the filter element support and the filter elements together to form a filter module which can be removed from the trough body. The filter elements are expediently arranged such that they cover the entire width of the trough body. The filter elements can be arranged one behind the other in the longitudinal direction of the trough. The filter elements can be arranged in a single layer or in several layers on top of one another.

As an alternative to the water-permeable filter element support, the filter elements can be designed to be self-supporting, for example in the case of filter containers filled with filter material. In this case, the self-supporting filter elements can be releasably secured in the trough body itself.

Filter elements having a flexible enveloping wall, i.e. filter bags for example, can be placed on the filter element support in such a way that they adapt to the shape of the filter element support and bear against an inner wall of the trough body while forming a seal. A sealing action between the filter elements and the inner wall of the trough body is important if any flow bypassing the filter elements is to be prevented. In the case of filter bags, this sealing action can be achieved by a pressure applied by the filter bags to the inner wall of the trough body. As a result, separate sealing elements are no longer required.

In a further development of the invention, the filter element support is placed above a trough base of the trough body, a lower region of the trough body forming a gutter for purified water below the filter element support. Depending on the distance between the filter element support and the trough base, a gutter having a larger or smaller cross-section is formed. It is therefore possible to use a relatively large area of the trough body for the discharge of purified water, allowing for a high output. In contrast, output is relatively low in the prior art referred to above, because the pipe cross-section of the half-drainage pipe of prior art is kept relatively small as a rule, in order to accommodate as much filter granulate as possible in the trough body. As an alternative to the drainage or rain-water gutter, the invention can also be applied to a soak-away. In this case, purified water is discharged from the filter apparatus for soaking into the ground.

In a further development of the invention, a filling of filter granules is used as a filter material. Particularly preferred are granules of an ion-exchange material.

The invention is further characterised in that a water inlet body having a flow-through section with a plurality of flow-through apertures through which contaminated water enters the filter material and a sedimentation chamber for the sedimentation of suspended matter is located above the filter material, the water inlet body having at least one water ducting element via which the contaminated water can be passed into the sedimentation chamber and from there into the flow-through apertures, or else directly into the flow-through apertures while at least partially bypassing the sedimentation chamber.

Normally, contaminated water is first passed into the sedimentation chamber, where suspended matter can settle. As a result of the rising water level of the sedimentation chamber, the water can be discharged from the water inlet body via the flow-through apertures and reach the filter apparatus. At high levels of precipitation, for example rain, the water can flow directly into the flow-through apertures while partially or wholly bypassing the sedimentation chamber, resulting in a higher water throughput.

In a particularly preferred embodiment, the water ducting element is arranged above the sedimentation chamber in such a way that, from a specified water volume, water can be passed directly into the flow-through apertures by means of a jumping tower effect while at least partially bypassing the sedimentation chamber. The water ducting element can be designed to be either stationary or adjustable. In an adjustable water ducting element, it would for example be possible to adjust its length or inclination.

In a particularly preferred embodiment, the water ducting element has an inward- and downward-oriented inlet incline. The water ducting element can be represented by a continuous edge of the water ducting body. Expediently, this edge is uninterrupted.

In a further development of the invention, the flow-through section of the water inlet body is represented by a dome-shaped high area, which is in particular formed from the base material of the water inlet body and surrounded by the trench-like sedimentation chamber.

The water inlet body can be placed on the filter elements of the filter apparatus. The weight of the water inlet body and of the water in the water inlet body applies a pressure to the filter elements, so that, in the case of filter elements designed as filter bags, additional pressure can be obtained for sealing the filter elements against the inner wall of the trough body.

It is particularly expedient if the water inlet body is a component which can be handled separately from the filter module. It is then possible to remove the water inlet body from the trough body without having to remove the filter apparatus. Together, the filter module and the water inlet body form a drainage module which can be removed from the trough body as a unit. Expediently, several such drainage modules are arranged one behind the other in the longitudinal direction of the trough body.

BRIEF DESCRIPTION OF THE DRAWINGS

A preferred embodiment of the invention is illustrated in the drawings and will be explained in greater detail below. Of the drawings.

DETAILED DESCRIPTION

FIGS. 1 to 10 show a preferred embodiment of the drainage device 11 according to the invention. The drainage device 11 is used for draining large surfaces such as road surfaces, parking areas or roof surfaces. By way of example, the drainage device 11 according to the invention is explained below in the form of a drainage or rain-water gutter. Alternatively, however, the drainage device 11 could be designed as a soak-away.

As FIGS. 1 to 5 show, the drainage device 11 comprises a trough body 12, which may be made of concrete, for example. As a rule, the trough body 12 is embedded in the soil. The trough body 12 contains a trough 13, which in the illustrated embodiment consists of a rectangular cross-section adjoined by a circular section. As the name suggests, the trough body 12 is open towards the top, the trough 13 being laterally bounded by two side walls 14*a*, 14*b* of the trough body 12, while the lower end of the trough body 12 forms the trough base 15.

Figure 1:
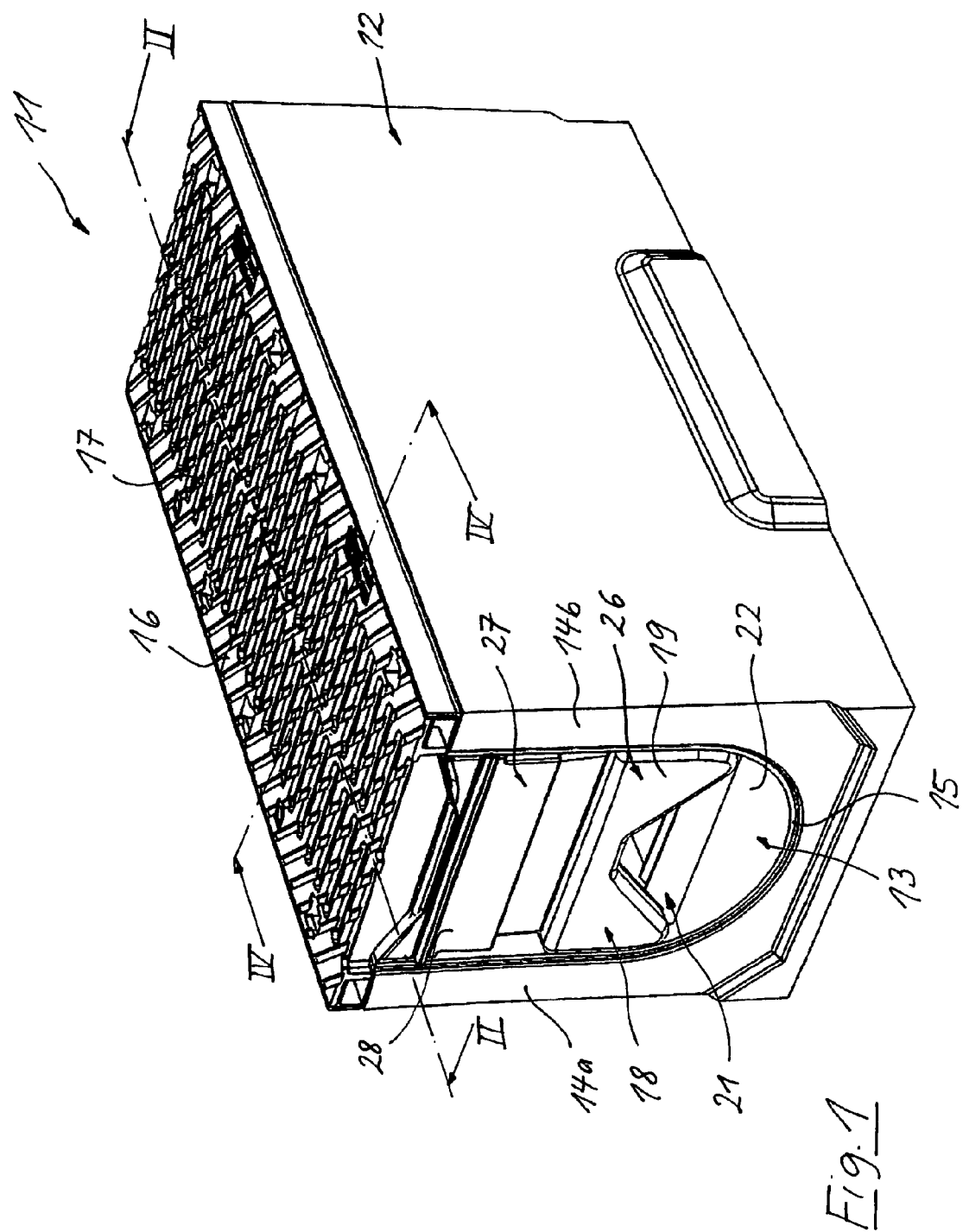
FIG. 1 is a perspective view of a preferred embodiment of the drainage device according to the invention.
Figure 2:
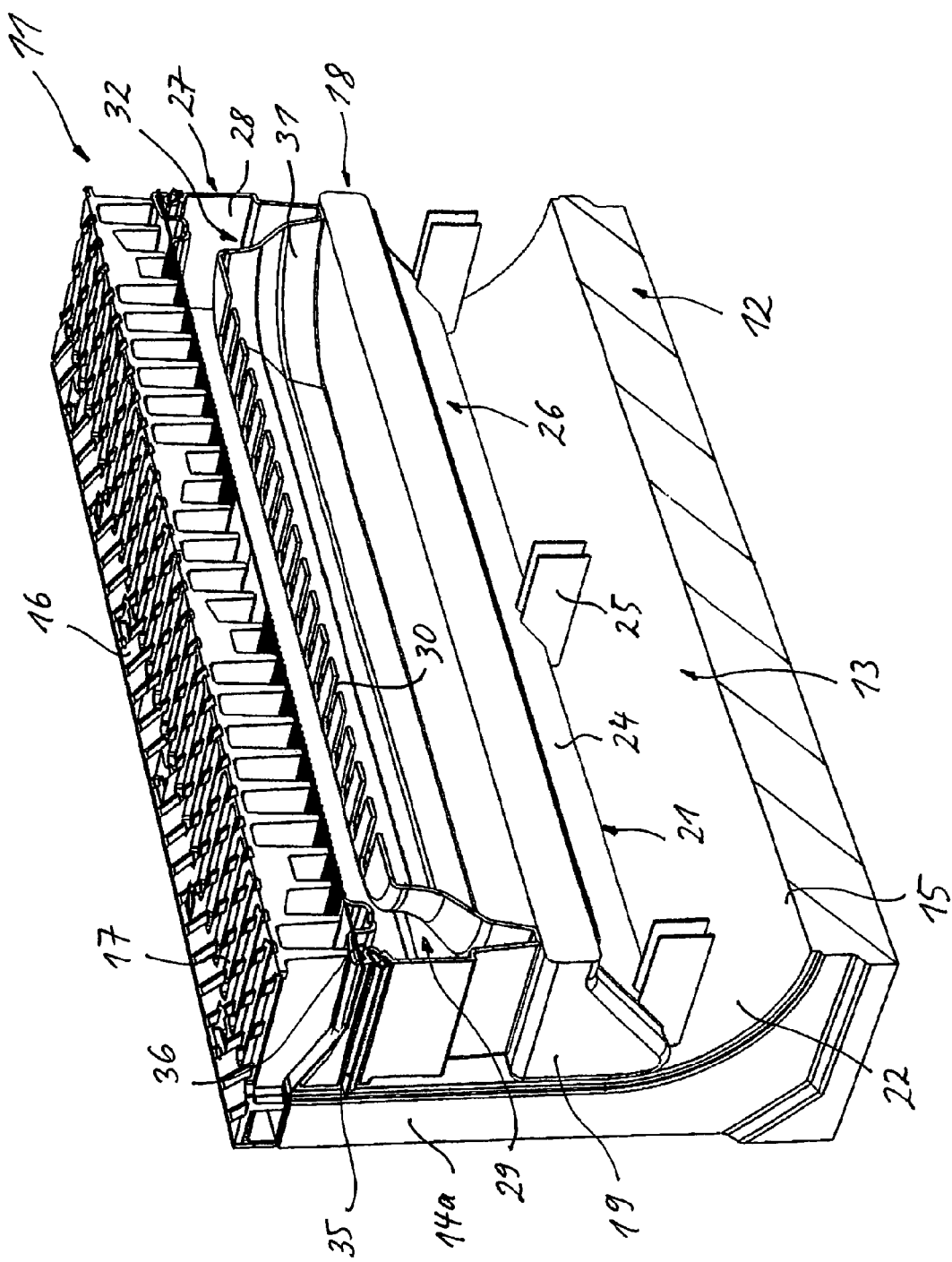
FIG. 2 is a longitudinal section through the drainage device from FIG. 1 along line II-II.
Figure 3:
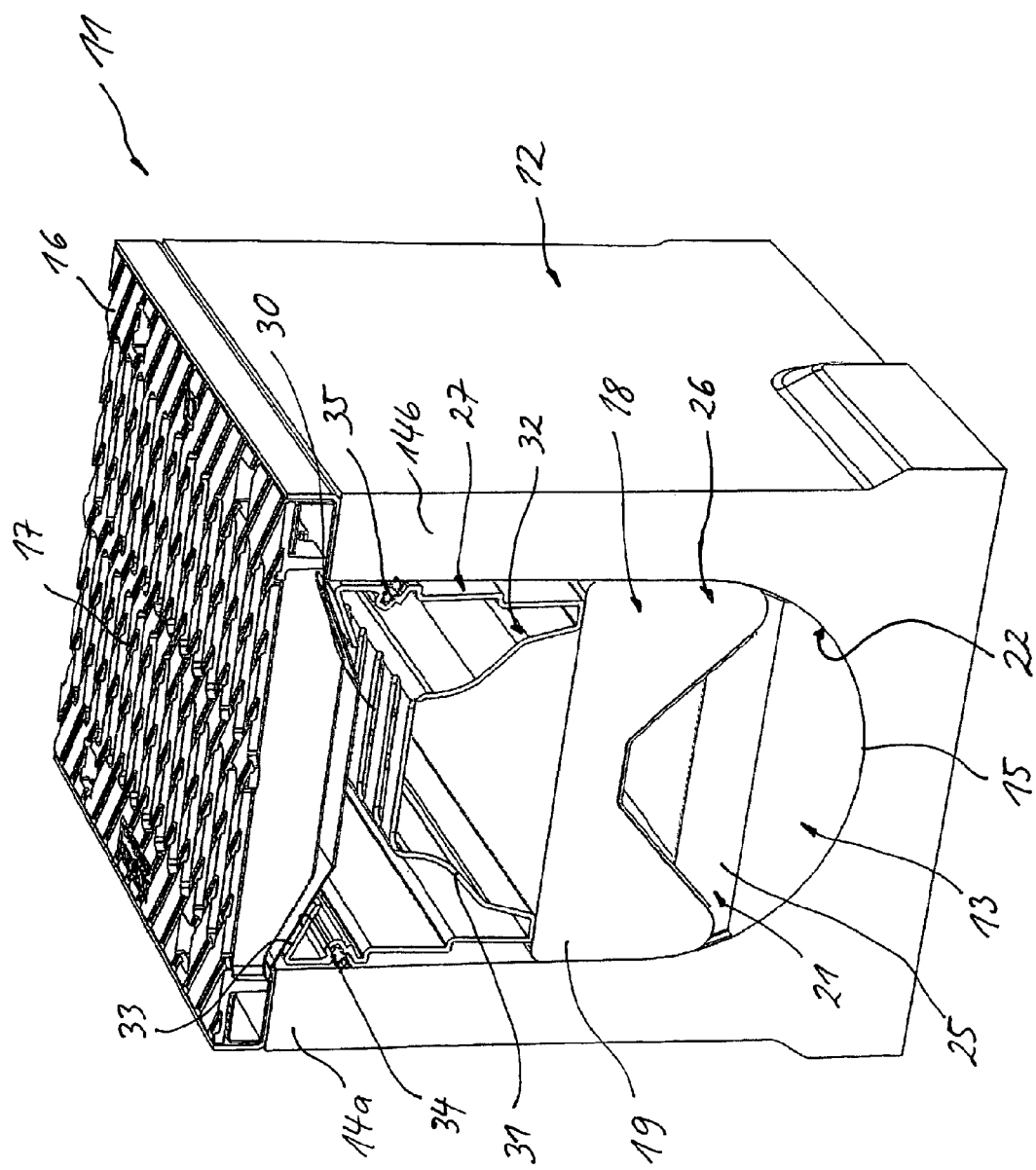
FIG. 3 is an enlarged perspective view of the drainage device according to the invention as shown in FIG. 1.
Figure 4:
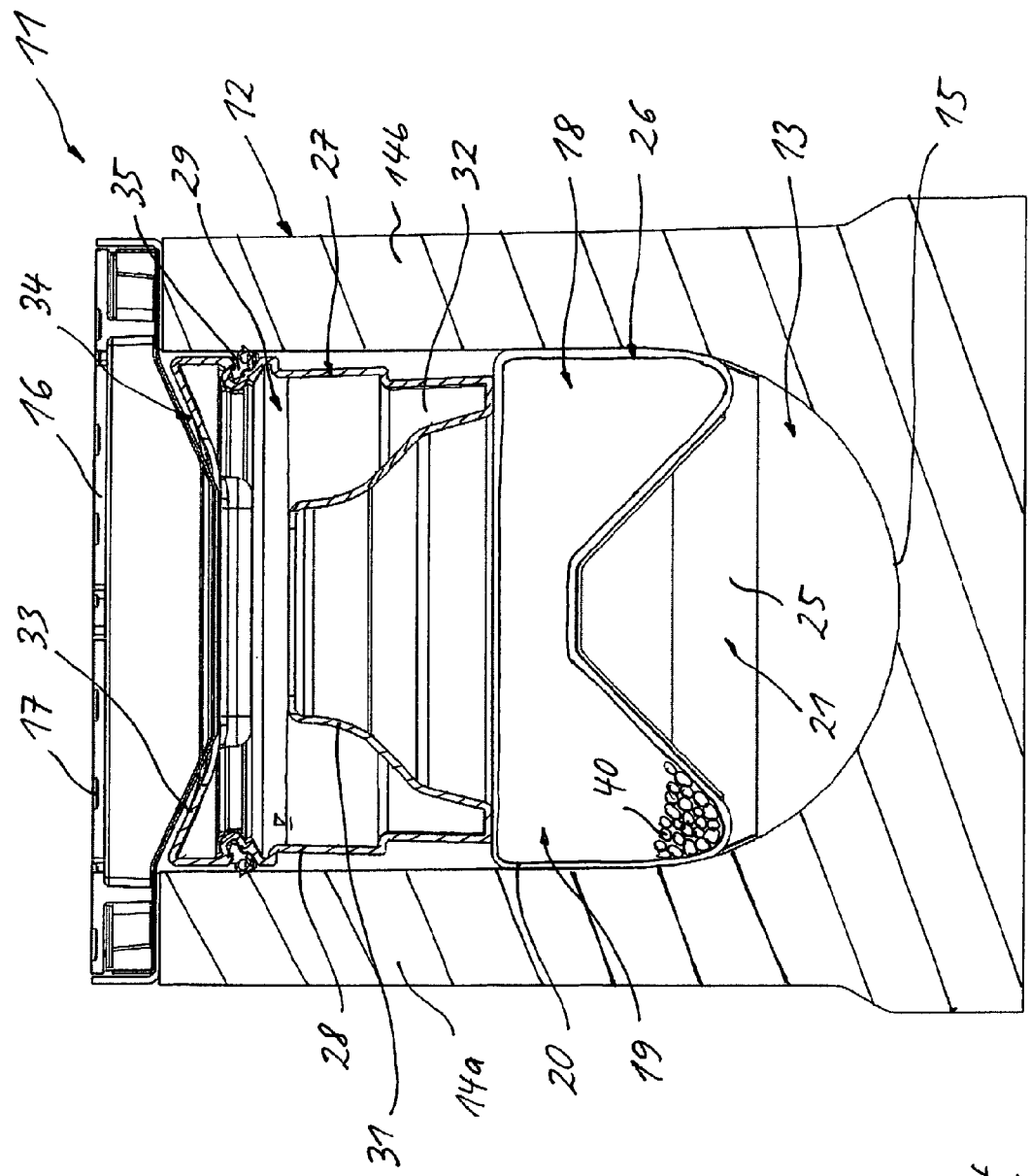
FIG. 4 is a cross-section through the drainage device from FIG. 1 along line IV-IV.
Figure 5:
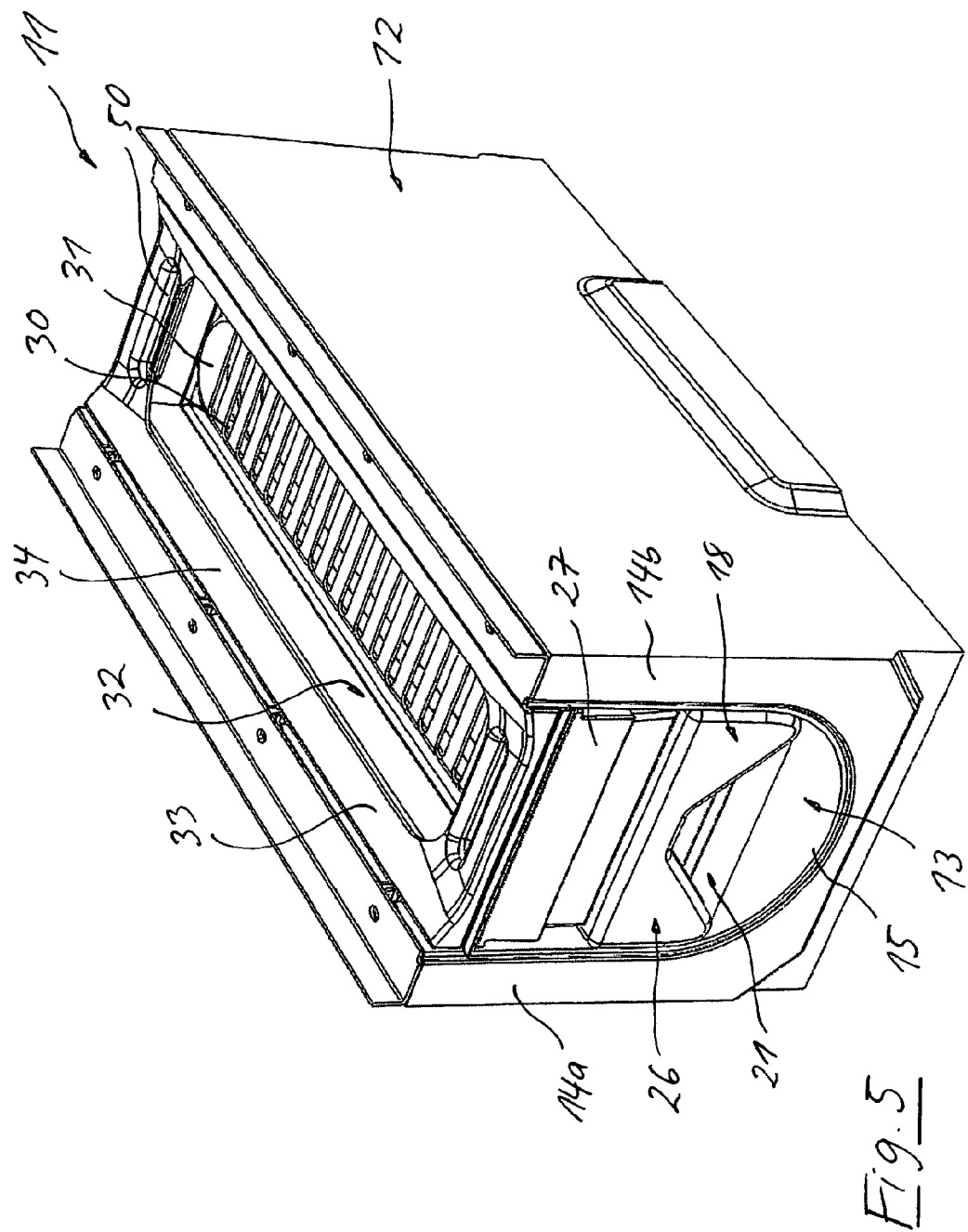
FIG. 5 is a perspective view of the drainage device from FIG. 1 without its grating cover.

As FIG. 1 shows particularly clearly, the upper end of the trough body 12 is covered by a grating cover 16. The grating cover 16 is provided with a plurality of inlet openings 17, through which contaminated water can enter the trough 13. The grating cover 16 is flush with the surface to be drained, for example a parking area or a road surface. The drainage device 11, i.e. the trough body 12 with the grating cover 16 in particular, is passable. The material of the trough body 12 and the material of the grating cover 16, which is made of a metallic material in particular, can be chosen such that heavy loads can pass over it.

As FIGS. 1 to 5 show particularly clearly, a filter apparatus 18 is located in the trough 13. The filter apparatus 18 comprises a plurality of filter elements 19, which can be handled individually and, if required, removed from the trough body 12, each of which filter elements 19 has a water-permeable enveloping wall 20 with filter material located within the enveloping wall 20.

According to the preferred embodiment, a flexible, water-permeable enveloping wall 20 is provided, which is represented by a bag-type envelope. The bag-type envelope is made of a textile fabric and filled with the filter material, so that the unit as a whole can be referred to as a filter bag.

Depending on the purification requirements applying to the surface water, various filter materials can be used. It is, for example, possible to use a filling of filter granules 40 (FIG. 4) as filter material. The filter granules expediently have a uniform shape, for example a spherical shape. Such a filling can for example meet the requirements of the separation regulations, so that water purified in this way no longer requires additional filtration in a precipitation tank.

If requirements are more stringent, for example in the case of water loaded with contaminants, an ion exchanger in granule form can be used as a filter material. With such a filter material, dissolved heavy metal ions can be filtered out, for example. In addition, a high AFS retention is obtained.

Figure 6:
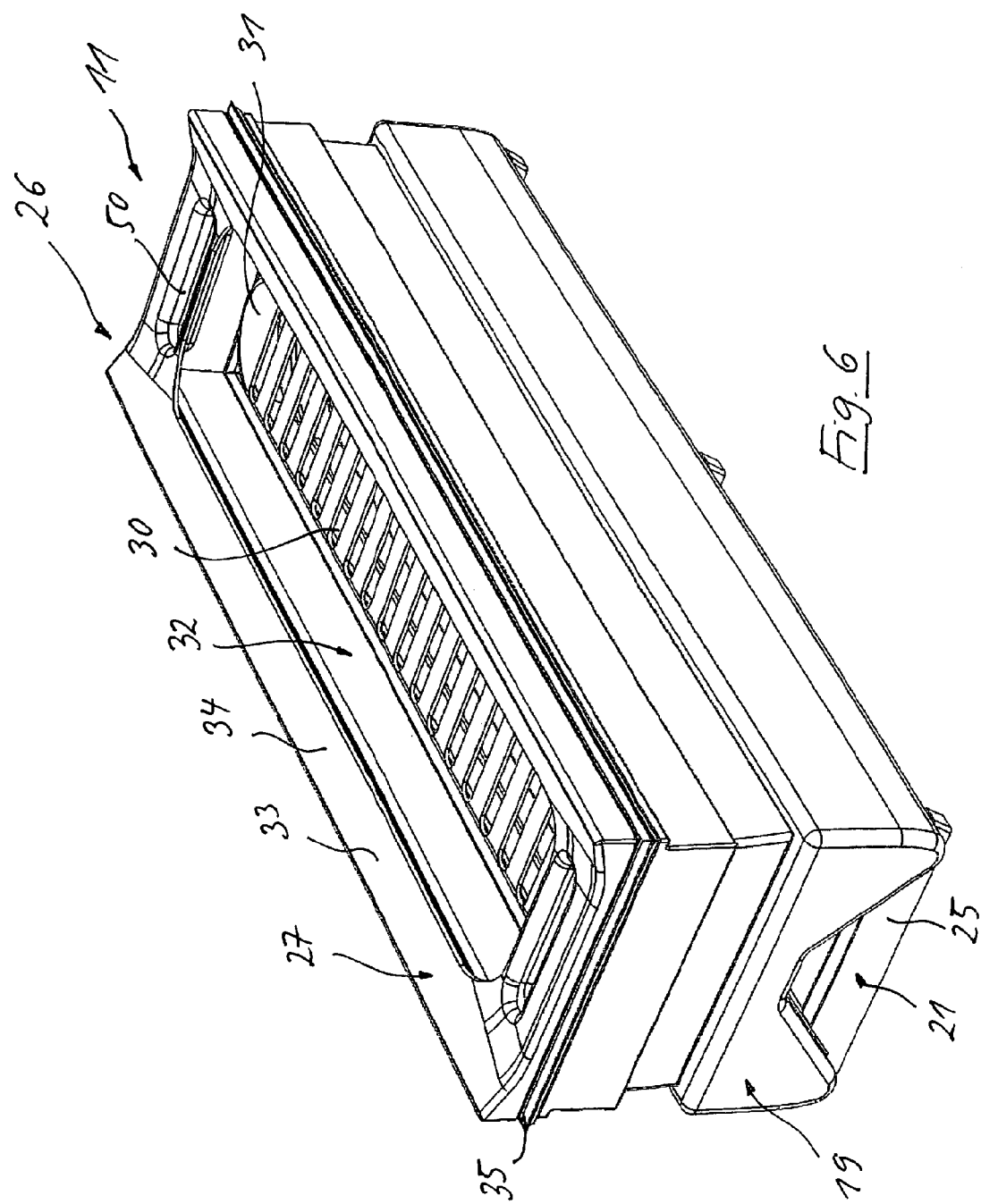
FIG. 6 is a perspective view of a drainage module of the drainage device from FIG. 1.
Figure 7:
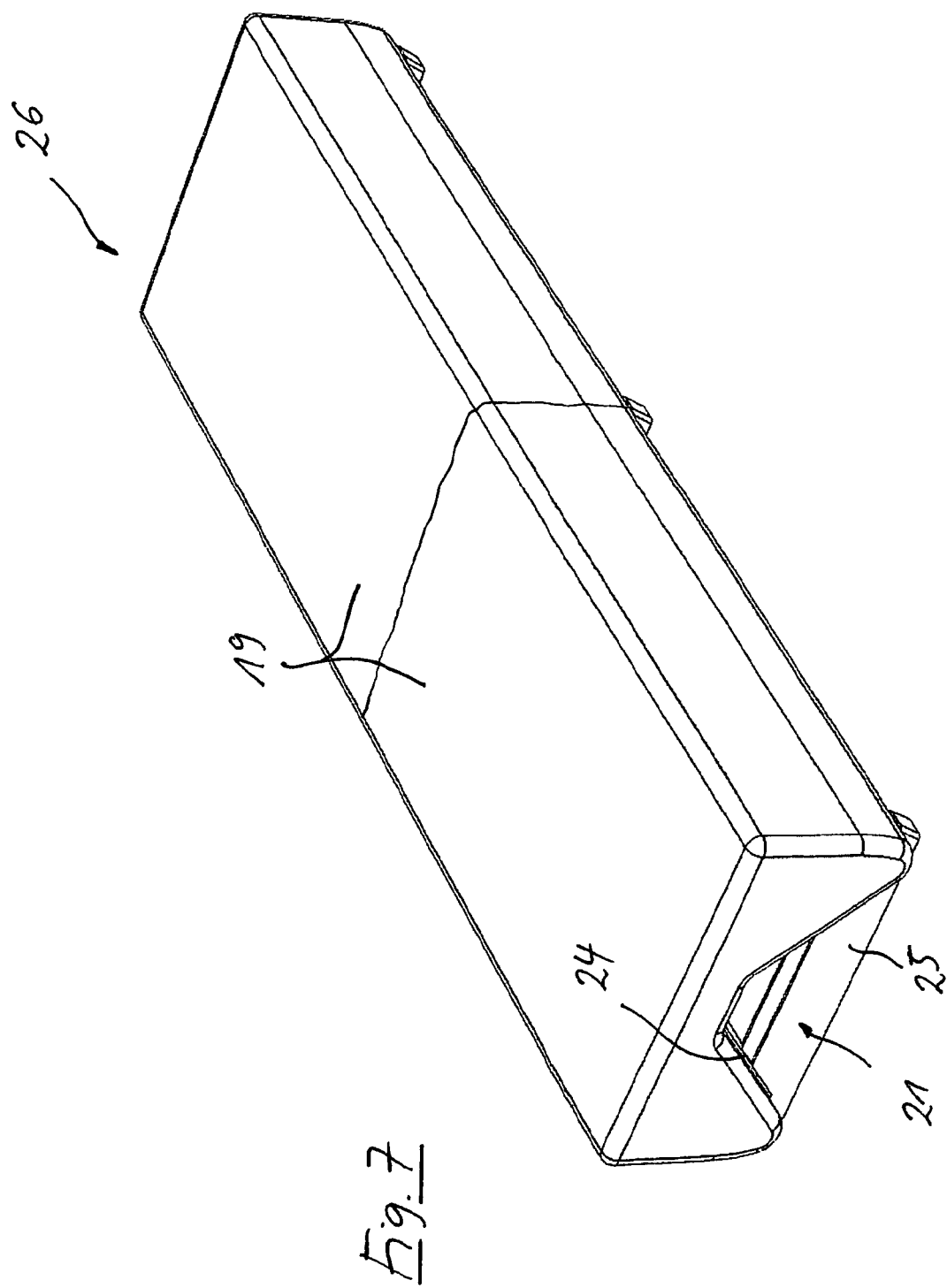
FIG. 7 is a perspective view of a filter module comprising a filter element support and filter elements.

As FIGS. 6 and 7 show in particular, the filter apparatus 18 comprises at least one water-permeable filter element support 21, on which the filter elements 19, i.e. the filter bags for example, are placed. The filter bags adapt to the shape of the filter element support 21 while contacting the inner wall 22 of the trough body 12 and provide a seal between the outside of the bag-type envelope and the inner wall 22 of the trough body 12, thereby preventing undesirable bypass flow.

Figure 8:
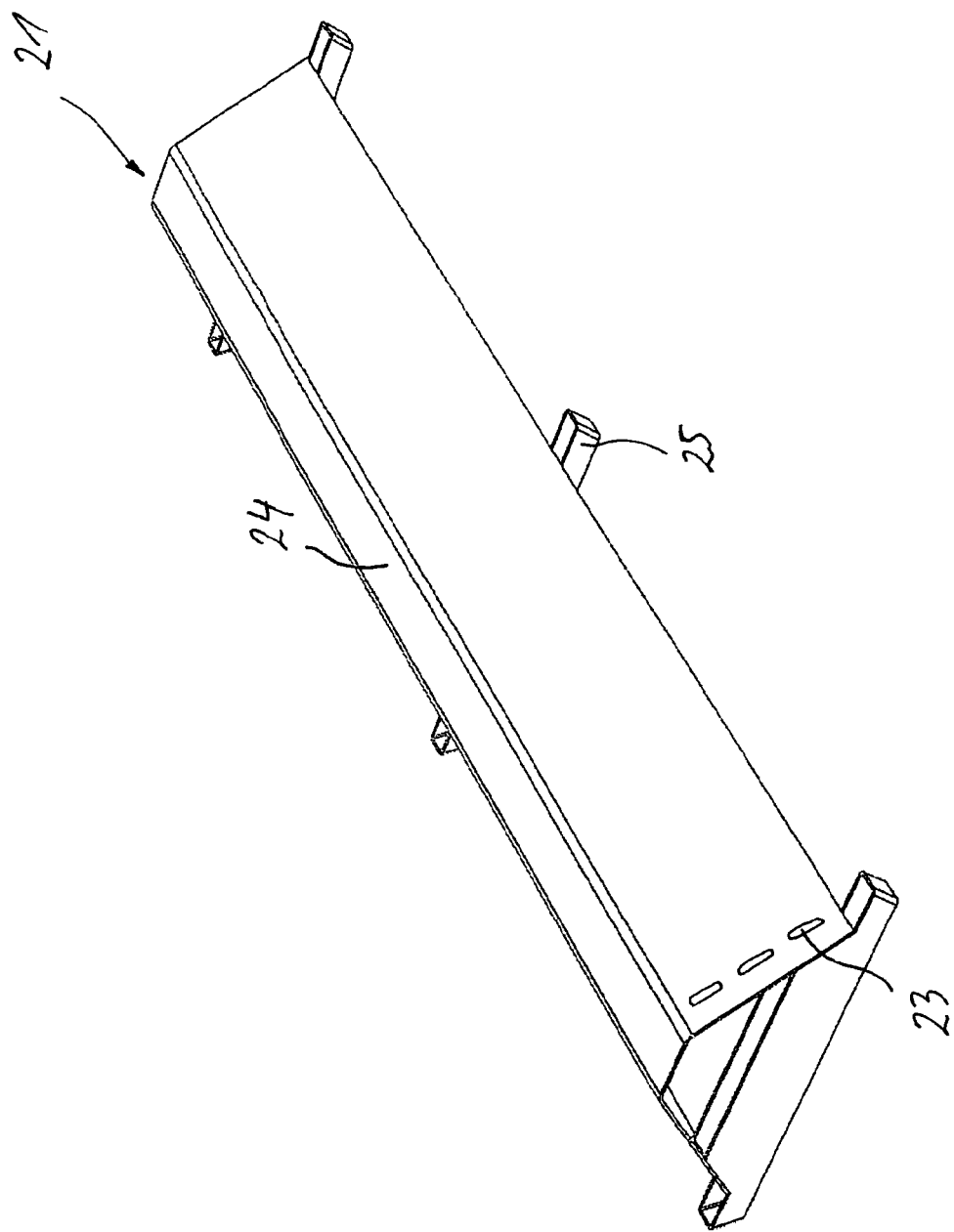
FIG. 8 is a perspective view of the filter element support.

As FIG. 8 shows, the filter element support 21 can be designed as a sheet metal profile having a plurality of discharge openings 23, for example in the form of slots. The filter element support 21 comprises a base section 24, which may, for example, be represented by the sheet metal profile. The base section 24 may be designed in the manner of a saddle, for example. The filter bags then lie on the base section 24. The filter bags extend across the entire width of the trough 13, therefore abutting one inner wall on one side and the other inner wall on the opposite side. Below the base section 24 of the filter element support 21, there are rail-type support sections 25, by way of which the filter element support 21 is held in the trough body 12. As the trough body 12 of the illustrated embodiment ends in a circular section at the bottom, resulting in a cross-section reduction, the filter element support 21 does not have to be secured to the inner wall 22 of the trough body 12 by separate fastening means. It is exclusively held in the trough 13 by the wedge action between the support section 25 and the reducing cross-section of the trough 13. In an alternative variant, the base section could be designed without any discharge openings, for example as a continuous sheet metal profile. In this case, the base section terminates in the radial direction, as shown in FIG. 8, at a distance from the inner wall of the trough body 12, being therefore shorter than the support section 25. This forms a discharge gap extending in the longitudinal direction between the outer edge of the base section and the inner wall. In this variant, the water is forced to flow downwards and outwards within the filter bag, until it reaches the discharge gap and is discharged there. This extends the dwell time of the water to be purified in the filter bag.

The filter element support 21 is therefore situated above the trough base 15, with a gutter for the discharge of purified water forming below the filter element support 21. As a whole, the filter element support 21 and the filter elements 19 in the form of filter bags form a filter module 26, which can be removed from the trough body 12 as an assembly. The filter apparatus 18 comprises a plurality of such filter modules 26, which are lined up one behind the other in the longitudinal direction of the trough.

Figure 9:
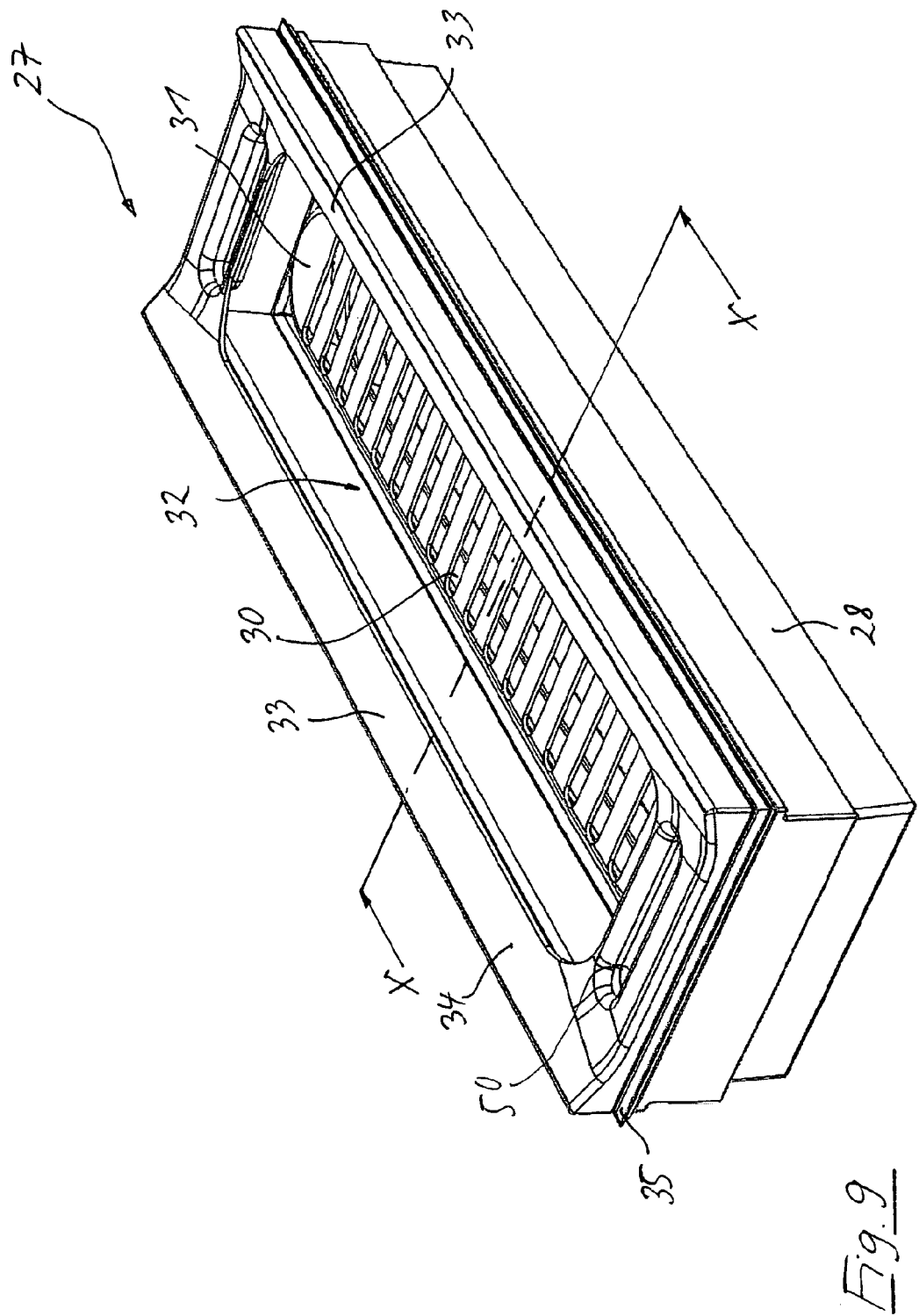
FIG. 9 is a perspective view of the water inlet body of the drainage device.
Figure 10:
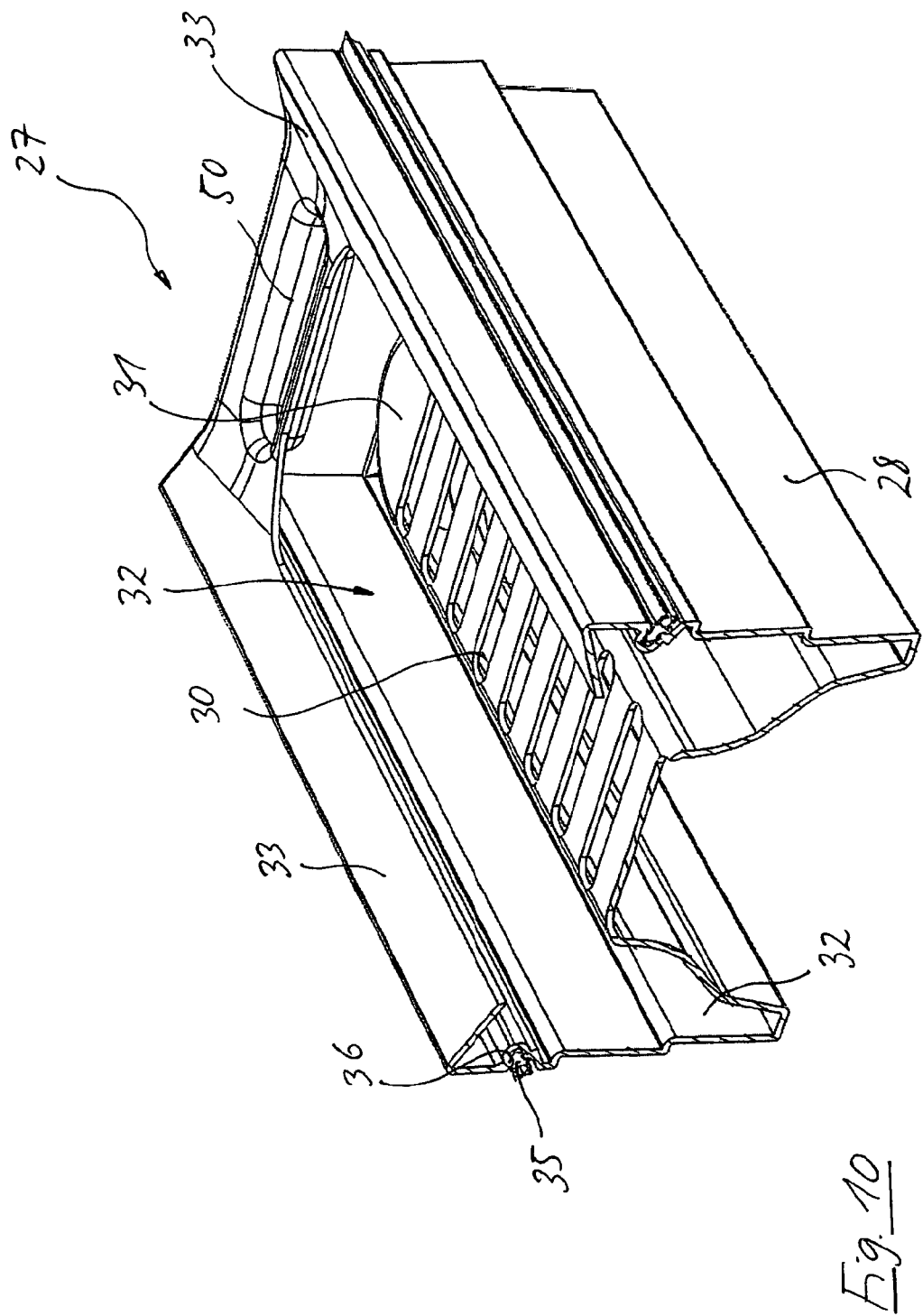
FIG. 10 is a section through the water inlet body from FIG. 9 along line X-X.

As FIGS. 1 to 5 show in particular, above the filter apparatus 18 there is provided a water inlet body 27, via which water enters the trough through the grating cover 16. The water inlet body 27 is expediently designed as a plastic component. As FIGS. 9 and 10 show in particular, the water inlet body 27 has a box-shaped base section 28, which encloses a water chamber 29. The water chamber 29 is basically divided into two different sections. On the one hand, there is provided a flow-through section 31 having a plurality of flow-through apertures 30, which is represented by a dome-shaped high area of the base of the water inlet body 27. The water chamber 29 further comprises a sedimentation chamber 32, which extends in the manner of a trench around the dome-shaped high area of the flow-through section 31, thereby enclosing it.

The sedimentation chamber 32 is used for the sedimentation or accumulation of suspended matter. From the sedimentation chamber 32, contaminated water flows to the flow-through section, where it flows through the flow-through apertures 31 into the filter apparatus 18 placed below.

An important aspect is that the water inlet body 27 has at least one water ducting element 33, via which the raw water can be passed into the sedimentation chamber 32 and from there into the flow-through apertures 30, or else directly into the flow-through apertures 30 while at least partially bypassing the sedimentation chamber 32.

In the illustrated embodiment, the water ducting element 33 is represented by a lip-shaped continuous upper edge of the water inlet body 27, which projects inwards into the region of the water chamber 29. The water ducting element 33 has an inward- and downward-oriented inlet incline 34. From a specified water volume, contaminated water flows directly to the flow-through apertures 30 by means of a jumping tower effect, while at least partially bypassing the sedimentation chamber 32. As a result, a higher water throughput can be obtained at times of heavy precipitation, e.g. heavy rain, thereby avoiding banking. As FIGS. 2 and 3 in particular show, the water inlet body 27 is placed on the filter sacks. The pressure applied by the weight of the water inlet body and the water therein additionally pushes the filter bags against the inner wall 22 of the trough body 12.

To prevent bypass flow between the inner wall of the trough body 12 and the outer wall of the water inlet body 27, a seal is provided. For example, sealing lips 35 can be provided, each of which is installed into a seal groove 36 provided for this purpose on the outside of the base section 28 of the water inlet body.

Together, the water inlet body 27 and the filter module 26 placed below and comprising filter elements 19, i.e. filter bags, and filter element supports 21 form a drainage module. This drainage module can be removed from the trough body 12 as an assembly. It is, however, also possible to remove only the water inlet body 27, while the filter module 26 remains in the trough body. For the removal of the water inlet body 27, handles 50 are in particular provided on the two opposite end faces of the water inlet body 27.

For draining the connected area, for example a parking area, road surface of even roof surface, contaminated water initially enters the trough 13 via the inlet openings 17 of the grating cover 16. At normal water volumes, the water first flows via the inlet incline 34 of the water ducting element 33 into the sedimentation chamber 32, where suspended matter settles. Contaminated water then flows via the flow-through apertures 30 of the flow-through section 31 into the filter module 26 placed below, where it enters the filter material through the water-permeable enveloping wall 20 made of sacking to be filtered there. Filtered, purified water is then discharged from the filter bags and flows via the discharge openings 23 in the base section 24 of the filter element support 21 into the gutter placed below, from where it can drain off.

What is claimed is:

1. A drainage device comprising:
    an elongated trough body (12) including an open trough (13) defined by two side walls (14 *a* & *b*) and a trough base (15);
    a filter element support (21) including a base section (24) having a plurality of discharge openings (23);
    a plurality of filter elements (19) having water permeable enveloping walls (20) and a filtration media (40) contained within said enveloping walls (20), said filter elements lie atop the base section (24) and extend across the width of the open trough (13);
    a flow-through section (31) having a plurality of flow-through apertures (30) and including a dome-shaped high area;
    a sedimentation chamber (32) for capturing incoming sediment, extends in the manner of a trench around the dome-shaped high area of the flow-through section (31);

a removable grating cover (16) having a plurality of inlet openings (17), and sits atop said side walls (14 *a* & *b*);

wherein, contaminated water enters said trough by flowing in through said inlet openings, then passes through said sedimentation chamber (32) where sediment is removed, and flows through apertures of said flow-through section, next passing through said filter elements (19) where contaminants are removed, with exiting, filtered, purified water then flowing through the discharge openings (23) in the base section (24) of the filter element support (21) into a gutter therebelow, from where it can drain off.

\* \* \* \* \*